United States Patent [19]
McCartney-Hoy

[11] Patent Number: 5,392,682
[45] Date of Patent: Feb. 28, 1995

[54] COMPUTERIZED TRAINING DEVICE FOR LEARNING TO PLAY A PIANO

[76] Inventor: Peter J. McCartney-Hoy, Rietschel Str. 13, 6520 Worms 15, Germany

[21] Appl. No.: 36,366

[22] Filed: Mar. 24, 1993

[51] Int. Cl.⁶ .................. G09B 15/00; G09B 15/08
[52] U.S. Cl. .................. 84/470 R; 84/478; 84/485 R
[58] Field of Search .......... 84/470 R, 477 R, 478, 84/485 R, 479 A

[56] References Cited

U.S. PATENT DOCUMENTS 4,730,533  3/1988  Schoerkmayr .................. 84/478

Primary Examiner—Michael L. Gellner
Assistant Examiner—Cassandra C. Spyrou
Attorney, Agent, or Firm—Reginald F. Roberts, Jr.

[57] ABSTRACT

A computerized musical keyboard and a method for using same to play or to learn to play a piano. The computerized musical keyboard includes a standard piano keyboard connected to a computer. The computer is programmed to select from a music module a piece of music to be played on the piano; and to generate a signal indicating the proper keys to be played, the correct sequence in which the keys are to be played, and the hand and finger to be used in striking each key, in order to play on the piano the piece of music selected.

2 Claims, 4 Drawing Sheets

COMPUTERIZED TRAINING DEVICE FOR LEARNING TO PLAY A PIANO

BACKGROUND OF THE INVENTION

The present invention relates to a musical instrument. More particularly, thee invention relates to computer-assisted playing of musical compositions.

U.S. Pat. No. 4,730,533 to Schoerkmayr discloses an electronic keyboard instrument having a plurality of keys each of which, upon actuation, generates a tone corresponding to the respective key. The keyboard includes optical-display means on each key. The display means indicate the proper sequence of the keys to be actuated.

The instrument described by Schoerkmayr suffers from the disadvantage that the electronic digital numbers displayed on each key must be arranged one beneath the other, because the respective tone may occur several times in the melody being played. For this reason, it is preferable that, as soon as the respectively-numbered key has been actuated, the number-display means be turned off in order not to confuse the player.

A second disadvantage is that a return knob is required to initiate a new sequence after the first sequence used has been exhaused. The return knob is actuated for the purpose of initiating a second beginning while the same melody is being played. The knob reilluminates the complete new sequence of numbers.

SUMMARY OF THE INVENTION

In general, the present invention provides a computer-assisted musical keyboard. A conventional keyboard such as one used for pianos or for organs is equipped with an optical rod. The rod, which is at least partly transparent and preferably is magnifying, is disposed in clear view of the user. Disposed in and along the length of the rod are a plurality of light-emitters or tone/vibration emitters. Each light-emitter or tone/vibration emitter is individually aligned with a particular key on the keyboard.

The keyboard and the optical rod are electrically connected to an electronic processor or computer, which is disposed in clear view of the user. The processor includes means for receiving a music module, a visual display of right and left hands, and electronic means for communicating with the keyboard and with the optical rod.

Each key to be struck as indicated, in proper sequence, by illumination of the light-emitter corresponding to that particular key. Play is initiated by the illumination of the first key to be struck for striking the first note to be played. After the first key has been struck, the light-emitter associated with that key is turned off, and the light-emitter associated with the second key to be struck is illuminated. At the same time, the appropriate hand and finger to be used when striking each key is displayed visually by the processor. The process is repeated until the final note has been struck.

DETAILED DESCRIPTION OF THE INVENTION

Figure 1:
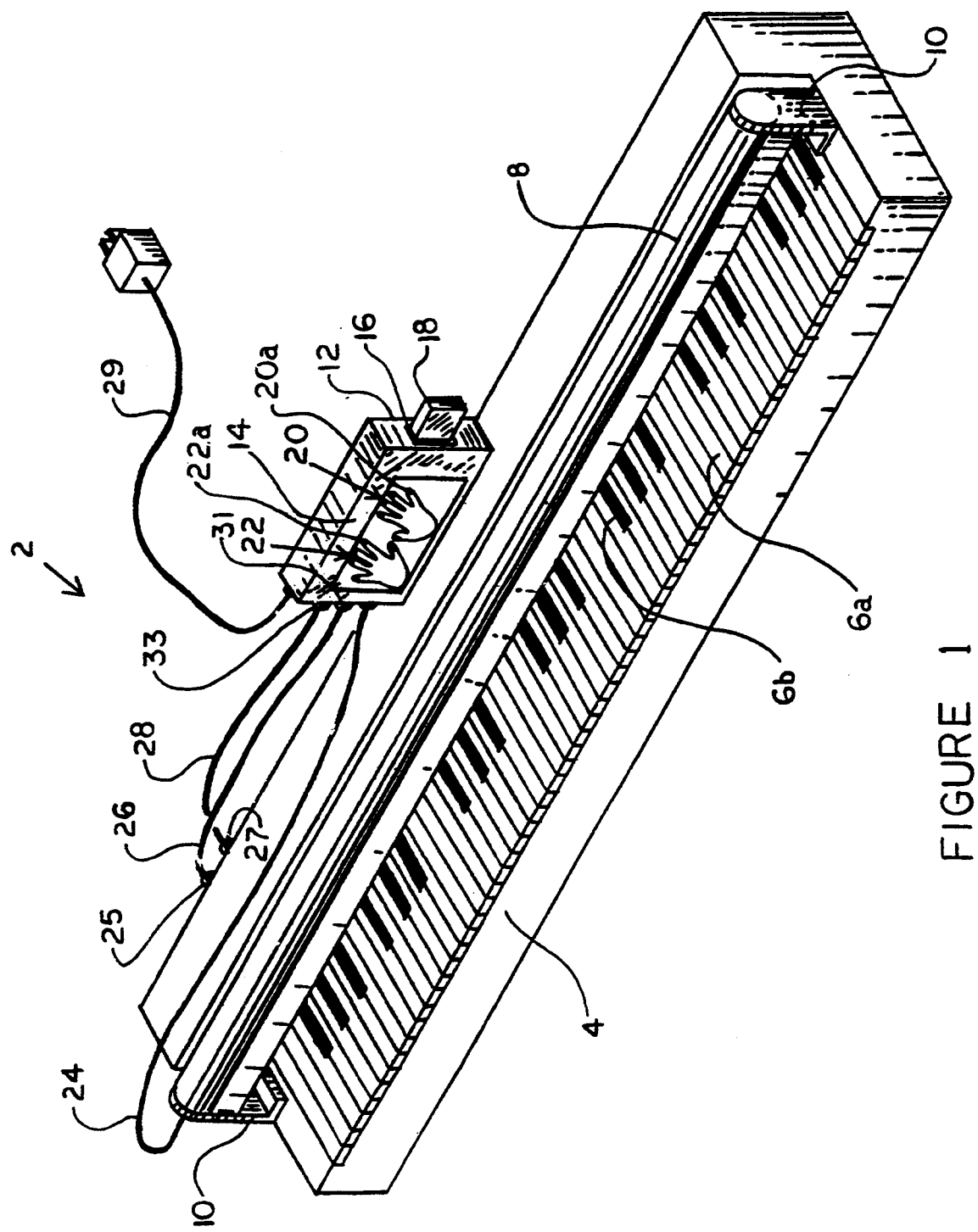
FIG. 1 is a schematic representation of a computerized musical keyboard, made in accordance with the principles of the present invention.

More specifically, reference is made to FIG. 1, in which is shown a computerized musical keyboard, made in accordance with the principles of the present invention, and generally designated by the numeral 2.

The computerized musical keyboard 2 comprises a keyboard 4 containing a plurality of white and black musical keys 6a and 6b, respectively. A removable optical rod 8 is attached to the keyboard 4 by a pair of brackets 10.

An electronic processor 12 is beneficially mounted on the keyboard 4 in such a manner that a display screen 14 is visible to a person using the keyboard 4. The processor 12 includes a slot 16 for receiving a music module 18. The processor 12 is programmed to display on the screen 14 a simulation of fingers 20a and 22a corresponding to right and left hands 20 and 22, respectively.

A first electrical cord 24 transmits a signal from the processor 12 to the optical rod 8. A second electrical cord 26 transmits a signal from the processor 12 via a first musical instrument data interface (MIDI) 31 to the keyboard 4 via a second MIDI 25. A third electrical cord 28 transmits a signal from the keyboard 4 via a third MIDI 27 to the processor 12 via a fourth MIDI 33. A fourth electrical cord 29 plugs into an electrical power outlet (not shown). Electrical switches (not shown) are beneficially used with any or all of the electrical cords 24, 26, 28, and 29.

Figure 2:
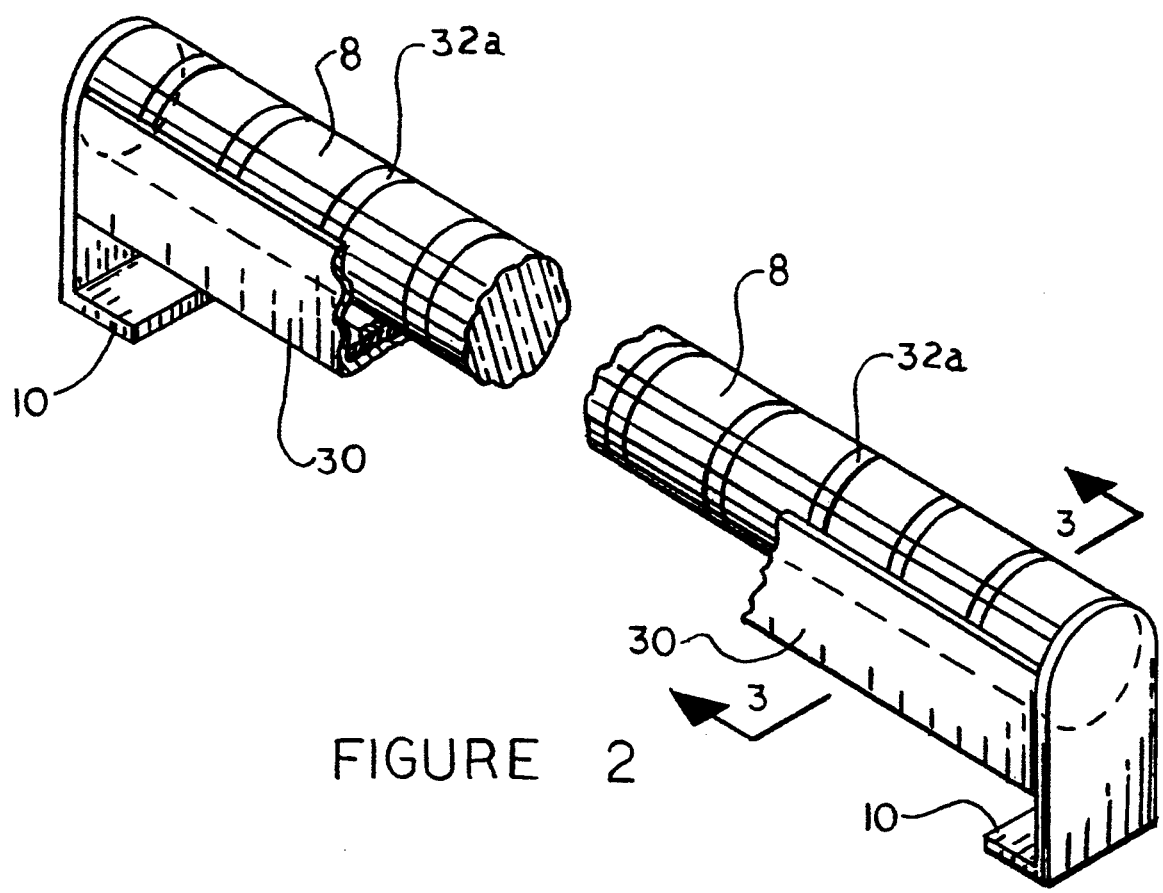
FIG. 2 is an isometric view of an optical rod, made in accordance with the principles of the present invention.
Figure 3:
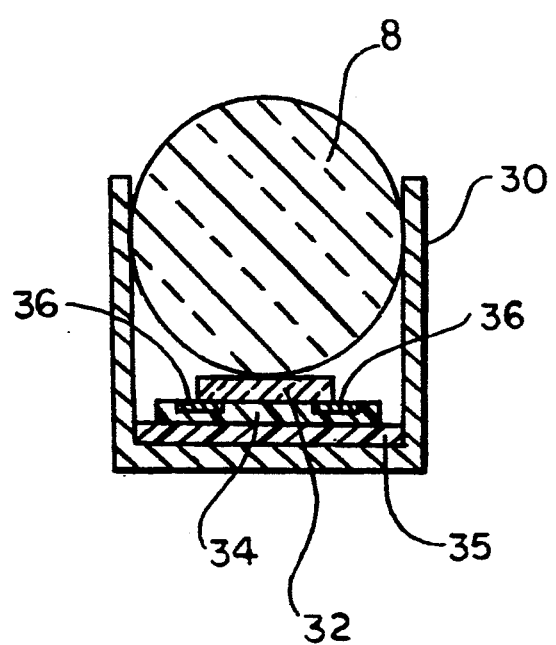
FIG. 3 is a cross-sectional view of the optical rod shown in FIG. 2, taken along the cutting line 3—3.

Reference is now made to FIGS. 2 and 3, showing the detailed construction of the optical rod 8, which is protected from breakage or other damage by a metal channel 30 and flexible insulation 35. A plurality of LED's 32 are disposed within and along the rod 8. Each LED 32 is aligned with a white or black key 6a or 6b. A magnified image of each LED 32 is shown at 32a.

A circuit board 34 controls the LED's 32 in accordance with signals received via the first electrical cord 24, which is connected to a pair of power tracks 36.

The optical rod 8, which is transparent and magnifying, is beneficially made of a plastic material.

Figure 4:
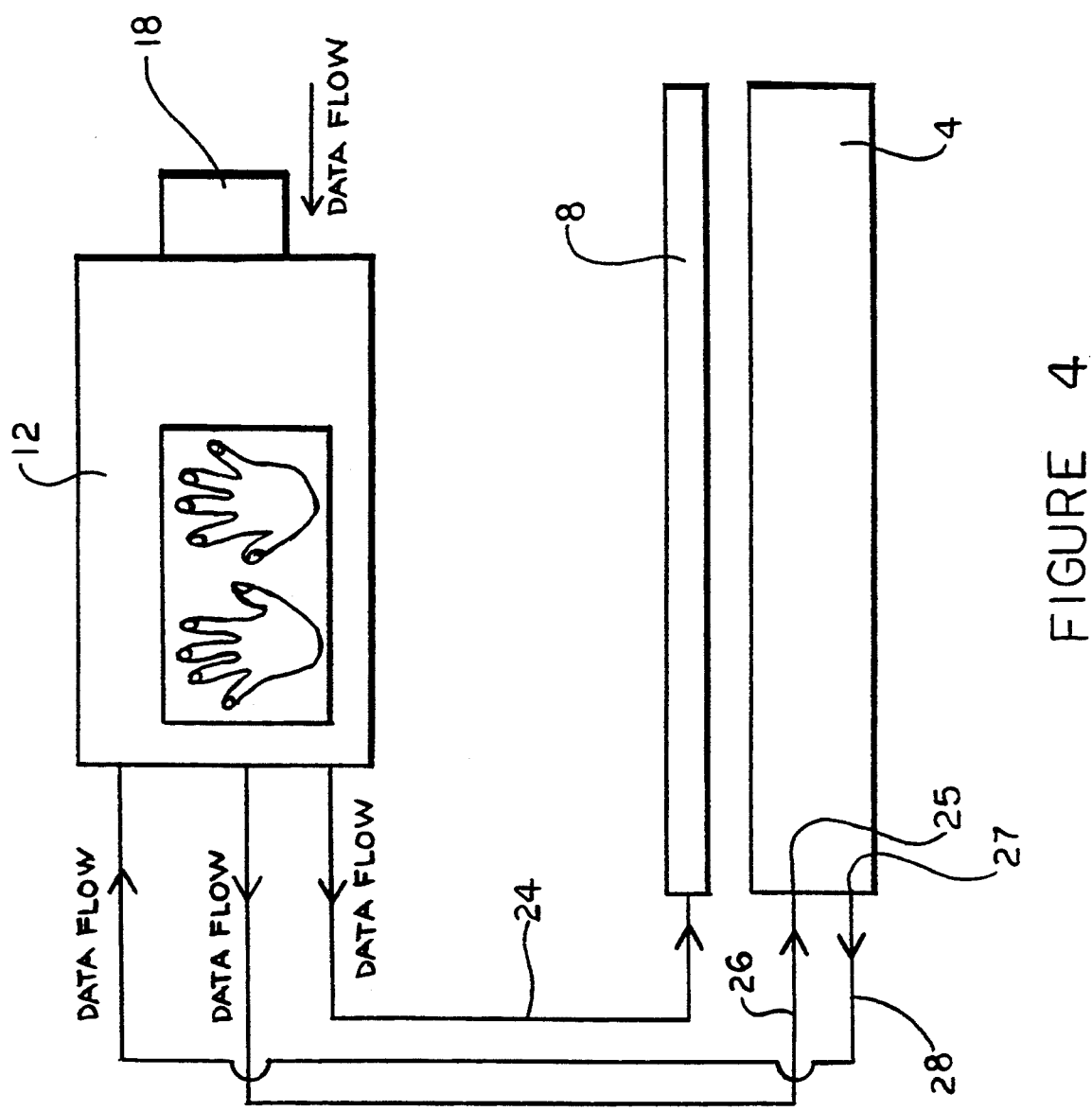
FIG. 4 is a connecting diagram of the electrical circuitry for the computerized musical keyboard shown in FIG. 1.
Figure 5:
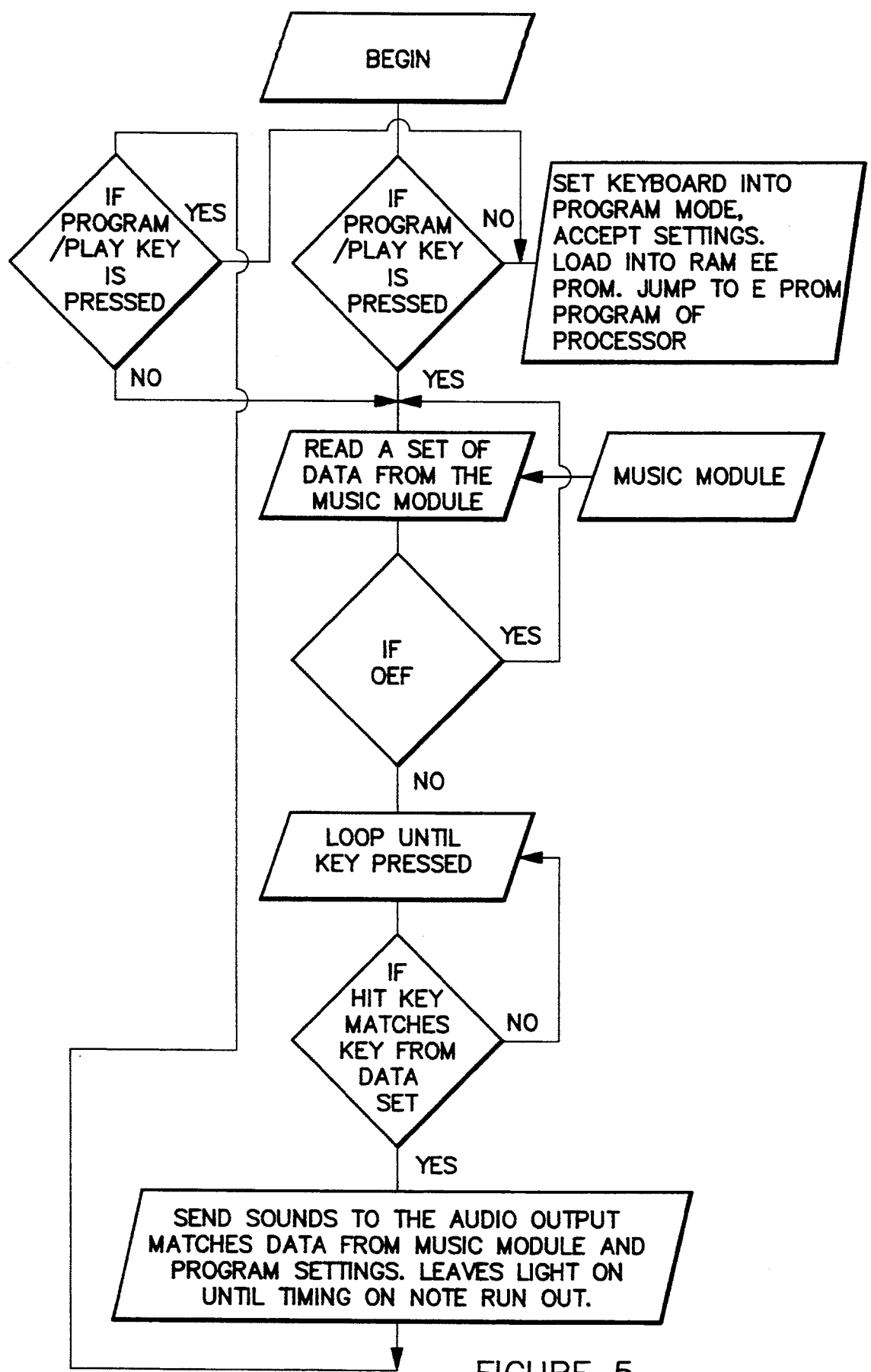
FIG. 5 is a flow diagram of the electronic program used for the computerized musical keyboard shown in FIG. 1.

Reference is now made to FIGS. 4 and 5, which show the pattern of data flow for the computerized musical keyboard 2 shown in FIG. 1.

A music module 18 is selected and inserted in the receiving slot 16 of the electronic processor 12. The module 18 typically contains several musical scores from which the user may choose a selection of his or her choice. The module 18 may also include different genres of music; e.g., classical, modern, gospel, or "oldies."

The musical keyboard 2 is then placed in "program mode" by tapping a "program/play" musical key 6a or 6b preferably disposed at the extreme left-hand or right-hand side of the keyboard 4. Once the musical keyboard 2 is in the program mode, several options are available. These options include (a) musical selection, (b) practice mode, (c) playing speed, (d) loop mode, (e) professional mode, (f) "super-professional" mode, and (g) real-time mode.

To select a particular musical score or musical composition, the user makes his or her selection by tapping one of several other keys 6a, 6b. For example a first key 6a designates a first choice, a second key 6a a second choice, and so on. The practice mode can be used for right-hand play only, left-hand play only, or play using both hands.

A music module 18 is selected and inserted into the electronic processor 12. The computerized musical keyboard 2 is placed in the program mode by tapping the program/play key 6a. The piece to be played is selected by tapping one of the selections keys 6a or 6b.

The practice mode can be set to run with or without accompaniment, in single key, or in chord. It can be set with or without a comparator. The comparator checks to see whether the proper key 6a, 6b or chord has been struck. Only if the proper key 6a, 6b or chord has been struck will the musical piece move on to the next key or chord 6a, 6b. If the practice mode is set with the comparator, only the correct key 6a, 6b being struck will advance the music. Practice mode with comparator can be useful with handicpapped individuals or with young children.

The speed at which the music is played can be varied by tapping a speed-up or a slow-down key 6a or 6b. The number of times the key 6a or 6b is tapped increases or decreases the speed proportionately.

The loop mode is used to repeat a particular section of a musical piece. This is done by advancing to the desired section, hitting a start-loop key 6a or 6b, and then moving to the end of the desired section and hitting an end-loop key 6a or 6b. The loop mode can be used to practice over and over again a particularly difficult section.

The professional mode checks to see whether the proper key 6a, 6b has been struck, irrespective of the force with which the key 6a, 6b has been struck. This information is interpreted by the electronic processor 12, and the processor 12 changes the force to what the music module 18 calls for.

The "super-professional" mode not only checks to see whether the proper key 6a, 6b has been struck, but also that the key 6a, 6b is played or held down for the proper period of time. The "concert-professional" mode does everything which the super-professional mode does, and in addition checks the velocity at which the key 6a, 6b is struck before moving on.

The real-time mode does not wait for the striking of the proper key 6a, 6b in order to continue play. The musical piece would continue to play through whether or not the player responds correctly to the finger-indicator display 20a, 20b.

Striking the program/play key 6a, 6b a second time switches the computerized musical keyboard 2 into the play mode. In one embodiment the play mode begins by illuminating the simulated appropriate finger(s) 20a, 22a of the simulated hands 20, 22, and the LED 32 above and aligned with the first key(s) 6a, 6b to be struck. When the key 6a, 6b has been struck, the program moves on to the next key 6a, 6b, and continues in this manner until the entire selection has been played.

The program utilized by the electronic processor 12 reads the first set of data from the musical piece selected, and outputs those data to the finger indicator 20, 22, which illuminates the proper finger(s) 20a, 22a which are to be used to play the first note or chord.

Data are also output to the optical rod 8, which then illuminates the appropriate LED 32 aligned with the key(s) 6a, 6b to be played. The program then goes into a "loop," and waits for a key 6a, 6b to be struck. The key 6a, 6b transmits its "ID" or identifying data to the program, where it breaks the loop and is analyzed. If the ID of the key 6a, 6b struck does not match the "ID" in the data read from the selected musical piece, the program reenters the loop. If the ID's match, the electronic processor 12 forwards these data, along with accompaniment if that parameter has been set, to a sound output (not shown). The program will now read the next set of data from the musical piece selected, and the whole process is repeated. This procedure will continue until the musical piece is completed or the program/play key 6a or 6b is struck again. In the real-time mode the program does not loop; the musical piece is played completely through along with the keys 6a, 6b struck, regardless of whether the key 6a, 6b is the correct key or whether any key 6a, 6b has been struck.

The programming keys 6a, 6b include (a) the program/play key, (b) a plurality of keys for choosing the musical compositions to be played, (c) melody plus accompaniment or music only, (d) channel 1 (default) only, (e) channel 1+prompter/channel 2, (f) channel 2−prompter alone, (g) channel 2−prompter−channel 1, channel 1+channel 2 prompter, (h) prompter (default/LED, (i) professional mode, (j) super-professional mode, (k) concert-professional mode, (l) loop mode, (m) start loop, (n) stop loop, (o) faster, (p) slower, (q) local off/local on, (r) channel 1 default/channel 3, and (s) reset/default.

Thus the present invention provides a method of learning or playing a MIDI-based keyboard, piano, or organ with a non-integrated MIDI-comparator processor 12 and an optical rod 8. A unique feature of the invention is the ability to connect existing commercially-available MIDI keyboards and pianos with equipment offering the player the possibility to play/practice/learn through the use of a light-indicating rod 8.

When a programming key 6a or 6b is struck, the data from the keyboard 4 are compared with data stored in the music module 18. In the programming mode these stored data can be varied in ways which include the following: (a) note/number indicated and compared or not compared; (b) note/velocity value indicated and compared or not compared; (c) play faster/slower; (d) selection of musical composition or piece, (e) selection of a particular part or section of a musical piece or composition; (f) parts of music pieces selected, played, substituted for, or filtered out; and (g) melody played with or without accompaniment, played singly or together in combination, compared singly or together, or indicated singly or together.

Notes/keys 6a, 6b indicated by the optical rod 8 and the finger 20a, 22a to be used can be shown with or without comparator/prompter. The playing of the music can be stopped until the correct key 6a or 6b has been struck, and the visual indication continues until the next note/key to be struck is indicated—with or without accompaniment. The visual indication persists until the proper duration of the note has expired.

In the professional mode, irrespective of how hard a key 6a, 6b is struck, the music is played as indicated in the music storage. This allows a non-professional (amateur) player to play a note as if the amateur were an experienced professional player.

A further development consists in this, that not only does the optical rod 8 indicate a key 6a or 6b to be struck and played, but when the correct key 6a, 6b has been struck, the LED 32 does not extinguish itself immediately, but instead stays on until the data contained in the music module 18 indicates the LED 32 should go out, thus indicating the length of time during which the note is to be played. A still further development is that the LED 32 will go out, but the music is not played further until the key 6a, 6b is no longer depressed. In this way the method can teach correct timing and rhythm.

Within the MIDI data is the allocation for individual channel numbers 1-16, which can be used to indicate various instruments; and in this case we use separate channels for a first melody, a second melody, and the accompaniment for both melodies. Thus, for example, the first melody is allocated to channel 1, the accompaniment to channel 2, and the second melody to channel 3.

I claim:

1. A computerized training device for learning to play a piano, comprising:
   (a) a keyboard including a plurality of musical keys;
   (b) means for selecting a piece of music to be played;
   (c) means for selecting the speed at which the music is to be played;
   (d) means for selecting a mode from a plurality of different playing modes including a practice mode, a loop mode, a professional mode, a super-professional mode, and a concert-professional mode, the practice mode being a basic mode, the loop mode repeating a particular section of the piece of music being played, the professional mode determining whether a proper key has been struck, the super-professional mode determining whether the proper key has been struck and further has been held down for a proper period of time, the concert-professional mode determining whether the proper key has been struck, whether the key has been held down for a proper period of time, and a velocity at which the key has been struck; and
   (e) means for sequentially indicating a key of the musical keys to be struck in playing the musical piece selected by the music-piece selecting means, at the speed selected by the speed-selecting means and in the mode selected by the mode-selecting means; the indicating means being aligned with the keyboard.

2. The computerized training device of claim 1, wherein the means for selecting the speed at which the piece of music is to be played further comprises a speed-up key and a slow-down key; the speed-selecting means increasing the speed in response to actuation of the speed-up key and reducing the speed in response to actuation of the slow-down key.

* * * * *